Jan. 12, 1971 W. E. MEARS 3,555,521

DIGITAL DELAY REGISTER

Filed Dec. 15, 1967 2 Sheets-Sheet 1

INVENTOR
William E. Mears

BY Schmidt, Johnson, Hovey, Williams & Bradley
ATTORNEYS.

Jan. 12, 1971 W. E. MEARS 3,555,521

DIGITAL DELAY REGISTER

Filed Dec. 15, 1967 2 Sheets-Sheet 2

INVENTOR
William E. Mears

BY Schmidt, Johnson, Hovey, Williams & Bradley
ATTORNEYS.

United States Patent Office 3,555,521
Patented Jan. 12, 1971

3,555,521
DIGITAL DELAY REGISTER

William E. Mears, Kansas City, Kans., assignor to Wilcox Electric Company, Inc., Kansas City, Mo., a corporation of Kansas Filed Dec. 15, 1967, Ser. No. 691,015
Int. Cl. G11c *19/00;* H03k *23/04*
U.S. Cl. 340—173 17 Claims

ABSTRACT OF THE DISCLOSURE

A digital register utilizes a series of stages, each including a storage flip-flop and a binary counter which is enabled by the flip-flop when the latter is placed in its information-storing state. When enabled, each counter counts a predetermined number of clock pulses and then returns the associated storage flip-flop to its standby state, and simultaneously transfers the timing information to the next subsequent stage by placing the storage flip-flop thereof in its information-storing state. The information transfer delay provided by each of the counters prevents the register from storing an input pulse which is spaced from a preceding pulse by less than a minimum duration of interest, thereby eliminating redundant storage stages.

Airborne transponders in use at the present time normally employ a passive delay line for decoding interrogating pulses transmitted to the airborne receiver by a ground station. Decoding is effected by providing taps along the delay line at preselected time intervals. For example, to decode a pair of interrogating pulses having a time spacing of 2.0 microseconds, the line would be tapped at 2.0 microseconds from its input so that the coincidence of the second interrogating pulse at the input and the first interrogating pulse at the tap would decode the pulse pair.

Passive delay lines utilize lumped LC components and thus are heavy, bulky and expensive. Furthermore, delay lines of this type attenuate pulses as they travel down the line and also drift with temperature. Tap timing is a trial and error technique and timing, delay, and resolution are fixed and cannot be changed without redesigning the line.

It is apparent from the foregoing that passive delay lines possess a number of disadvantages. Since a delay line is, in effect, a pulse storage device, it might be presumed that many of the foregoing disadvantages could be overcome through the use of a computer type register in place of the passive delay line. However, a shift register capable of meeting the resolution and memory requirements in transponder applications presents cost problems due to the many redundant stages of the register which are needed in order to provide the required resolution.

As an example of the difficulty of the shift register approach suggested above, it is assumed that design requirements call for a 20 microsecond delay time capacity with an accuracy or resolution of plus or minus 0.125 microsecond. Under such requirements, a 4 mHz. clock would be utilized having a spacing between the leading edges of adjacent clock pulses of 0.25 microsecond. Thus, the number of binary stages of the shift register would equal 80, or one stage for every 0.25 microsecond increment.

If, however, the minimum spacing between input pulses is 2.0 microseconds and closer spacing need not be stored, then the maximum number of pulses to be stored in the register is 10. It is apparent, therefore, that 70 stages of the register are redundant and are provided solely for purposes of resolution rather than information storage.

It is, therefore, the primary object of this invention to provide a register which will store input pulses without the use of redundant stages in order that the complexity and cost of the register may be substantially reduced without lowering storage capacity requirements.

As a corollary to the foregoing object, it is an important aim of the instant invention to provide such a register in which transfer of pulse information from one storage stage to another is delayed for a time period equal to the minimum pulse spacing desired to be remembered, but wherein the resolution of the register for pulse spacings equal to or greater than the minimum spacing is unimpaired.

Furthermore, it is an important object of the invention to provide a register as aforesaid utilizing counters in conjunction with storage flip-flops to obtain the delay in information transfer.

Figures 1, 2:
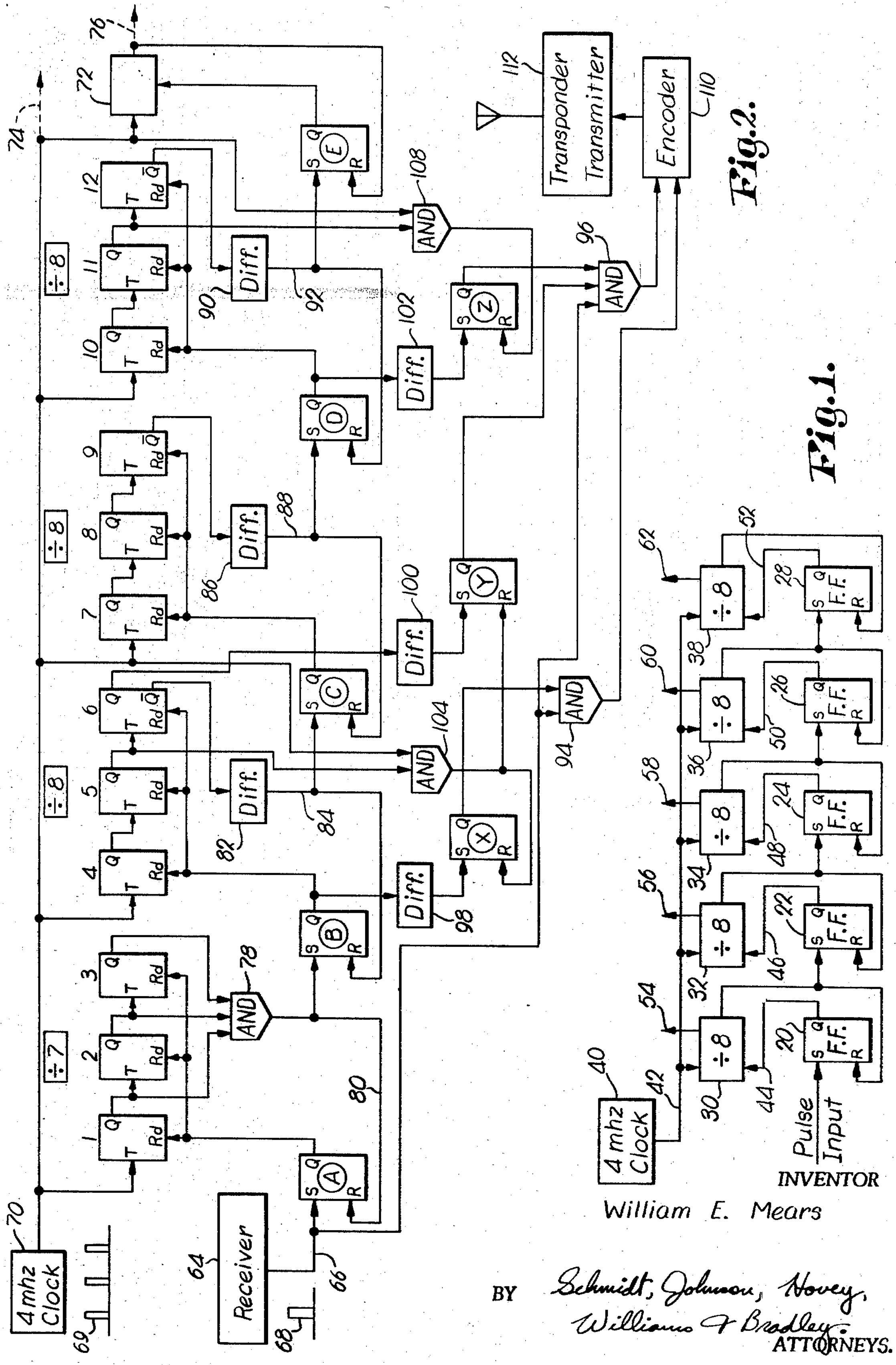
FIG. 1 is a logic and block diagram illustrating the basic teachings of the instant invention.
FIG. 2 is a logic and block diagram of the register of the instant invention shown utilized in the decoder section of a transponder.

It should be understood at the outset that, although the advantages and capabilities of the instant invention are discussed herein primarily in association with the decoder section of an airborne transponder, the teachings of the invention are applicable broadly to pulse memory systems. This is illustrated in FIG. 1 where five storage devices are shown in the form of bistable multivibrators or flip-flops 20, 22, 24, 26 and 28. Each of the flip-flops is of the set-reset type, the set input being designated "S" and the reset input "R." One output of each flip-flop is designated "Q" and is at the "O" logic level when the flip-flop is reset.

Five counters 30, 32, 34, 36 and 38 are associated with respective flip-flops 20–28 and are each of the 3-stage binary type. Thus, each counter block is designated by the divide-by-eight symbol to indicate that eight pulses from a clock 40 are counted during the time that the associated flip-flop is set. Clock pulses are applied simultaneously to the five counters 30–38 by the line 42; the outputs of the flip-flops 20–28 are delivered to respective counters 30–28 to enable or turn on the latter via lines 44, 46, 48, 50 and 52. The binary logic of counter 30 may be utilized as required by a particular application, as represented by the counter output lead 54. Similarly, logic output leads 56, 58, 60 and 62 are provided for counters 32–38 respectively.

A clock frequency of 4 mHz. will be assumed for purposes of illustration. The clock pulses appearing along line 42, therefore, have a leading edge spacing of 0.25 microsecond. With all of the flip-flops 20–28 reset, none of the counters 30–38 operate and the register is in standby.

When an input pulse is applied to the set input of flip-flop 20, the output thereof assumes the logic "1" level and delivers the command along line 44 to enable counter 30. The counter 30 then counts eight clock pulses and then delivers an output to the reset terminal of flip-flop 20, returning the latter to standby and setting flip-flop 22. It should be understood in this respect that the logic of the register of FIG. 1 is such that each of the flip-flops is set only when its S input is excited by a wave form which is going from the "1" logic level to the "0" logic level. It may thus be seen that the input pulse is effectively transferred from flip-flop 20 to flip-flop 22 after a time interval of approximately 2.0 microseconds. Furthermore, 2.0 microseconds later, counter 32 times out, resets flip-flop 22, and the information is shifted to flip-flop 24 by the setting thereof. Ultimately, after a 10 microseconds duration commencing with the setting of flip-flop 20, the flip-flop 28 is reset by counter 38 and the information is lost. For additional capacity, as many flip-flops and counters may be added to the series as desired.

A consideration of the foregoing reveals that, using the exemplary 4 mHz. clock frequency, a time memory capacity of 10 microseconds is obtained through the use of only five storage flip-flops 20–28 and fifteen counter flip-flops, three for each of the three section counters 30–38. If the size of the register illustrated in FIG. 1 were doubled, then a total of ten storage flip-flops and thirty counter flip-flops would provide a time memory capacity of 20 microseconds. Thus, a total of 40 binary elements yields the same storage capacity as the shift register discussed hereinabove in the introductory portion of this specification, but with half as many binary elements.

The register of FIG. 1 assumes that it is required that any two adjacent input pulses having a spacing of at least 2.0 microseconds are to be transferred throughout all of the storage flip-flops 20–28. In practice, however, requirements may be such that, after a predetermined time following the first input pulse, it is required that only pulse spacings of greater length be stored in the memory. In such case, the delay in transfer time provided through the use of the counters may be extended in later stages so that no redundant storage flip-flops will be utilized.

Referring to FIG. 2, a transponder receiver 64 delivers its output along a line 66 to the set input of the storage flip-flop A. An interrogation pulse from the receiver output is illustrated at 68. A divide-by-seven counter is enabled by flip-flop A and comprises three counter flip-flops designated Nos. 1, 2 and 3. These counter flip-flops and others to be mentioned hereinafter are trigger flip-flops with a DC reset. The trigger input is labeled "T," and the reset is designated "$R_d$." The counter flip-flop No. 1 triggers on the trailing edge of a clock pulse 69 applied to its T input by a 4 mHz. clock 70. At zero count, the Q outputs of the counter flip-flops are at the "0" logic level.

Three additional stages of the register of FIG. 2 are shown in detail and comprise storage flip-flops B, C and D and their associated divide-by-eight counters. Counter flip-flops Nos. 4, 5 and 6 are enabled by storage flip-flop B, counter flip-flops Nos. 7, 8 and 9 are enabled by storage flip-flop C, and counter flip-flops Nos. 10, 11 and 12 are enabled by the storage flip-flop D. Counter flip-flops Nos. 4, 7 and 10 are responsive to the trailing edges of clock pulses emanating from clock 70, in the same manner as counter flip-flop No. 1. Each of the counter flip-flops 2, 3, 5, 6, 8, 9, 11 and 12 is triggered by the resetting of the preceding counter flip-flop, i.e. a change in the Q output of such preceding flip-flop from the "1" to the "0" logic level.

A fifth stage comprises a storage flip-flop E and a three section binary counter 72 identical to the three preceding divide-by-eight counters. Thus, five complete stages are formed for purposes of illustration; additional stages may be added as indicated by the broken lines 74 and 76 extending from the clock output and the output of counter 72 respectively.

The divide-by-seven counter is provided with an AND gate 78 having three inputs connected to respective Q outputs of counter flip-flops Nos. 1, 2 and 3. The output of AND gate 78 is connected by a line 80 to the reset terminal of storage flip-flop A, and to the set terminal of storage flip-flop B.

The first divide-by-eight counter delivers its output from the $\overline{Q}$ output terminal of counter flip-flop No. 6, such output being differentiated by a differentiating network 82 and applied via line 84 to the reset input of storage flip-flop B and the set input of storage flip-flop C. Similarly, the second divide-by-eight counter derives its output from the $\overline{Q}$ output terminal of counter flip-flop No. 9, such output being differentiated by a differentiating network 86 and delivered via line 88 to the reset input of storage flip-flop C and the set input of storage flip-flop D. The output of the third divide-by-eight counter is taken at the $\overline{Q}$ output terminal of counter flip-flop No. 12, differentiated at 90, and delivered via line 92 to appropriate inputs of storage flip-flops D and E. The remaining divide-by-eight counter 72 is coupled with its associated storage flip-flop E in like fashion.

Two examples of decoding of interrogating pulses 68 are illustrated in FIG. 2, the decoding elements comprising window flip-flops X, Y and Z and AND gates 94 and 96. The window flip-flops X, Y and Z are of the set-reset type, flip-flop X being set by storage flip-flop B when the Q output thereof assumes the "1" logic level. A differentiating network 98 is connected between the Q output of flip-flop B and the set input of flip-flop X. Similarly, window flip-flop Y is set by the Q output of counter flip-flop No. 6 through a differentiating network 100. Window flip-flop Z is set by the Q output of storage flip-flop D through a differentiating network 102.

Resetting of the window flip-flops X, Y and Z is accomplished by two AND gates 104 and 108. AND gate 104 has two inputs connected to the Q output of counter flip-flop No. 5 and the clock 70 respectively. The AND gate 108 has two inputs connected to the Q output of counter flip-flop No. 11 and the clock 70 respectively. The output of AND gate 104 is connected to the reset inputs of flip-flops X and Y, and the output of AND gate 108 is connected to the reset input of flip-flop Z.

The outputs of the two decoding AND gates 94 and 96 are connected to an encoder 110 which, in turn, delivers information to the transmitter 112 of the transponder system. In the exemplary decoding arrangement of FIG. 2, a window is provided at 2 microseconds by flip-flop X, the Q output thereof and the receiver output 66 being connected to the inputs of AND gate 94. Windows are also provided at 3 microseconds and 6 microseconds by flip-flops Y and Z respectively, the Q outputs thereof and the receiver output 66 being connected to the inputs of AND gate 96.

Figure 3:
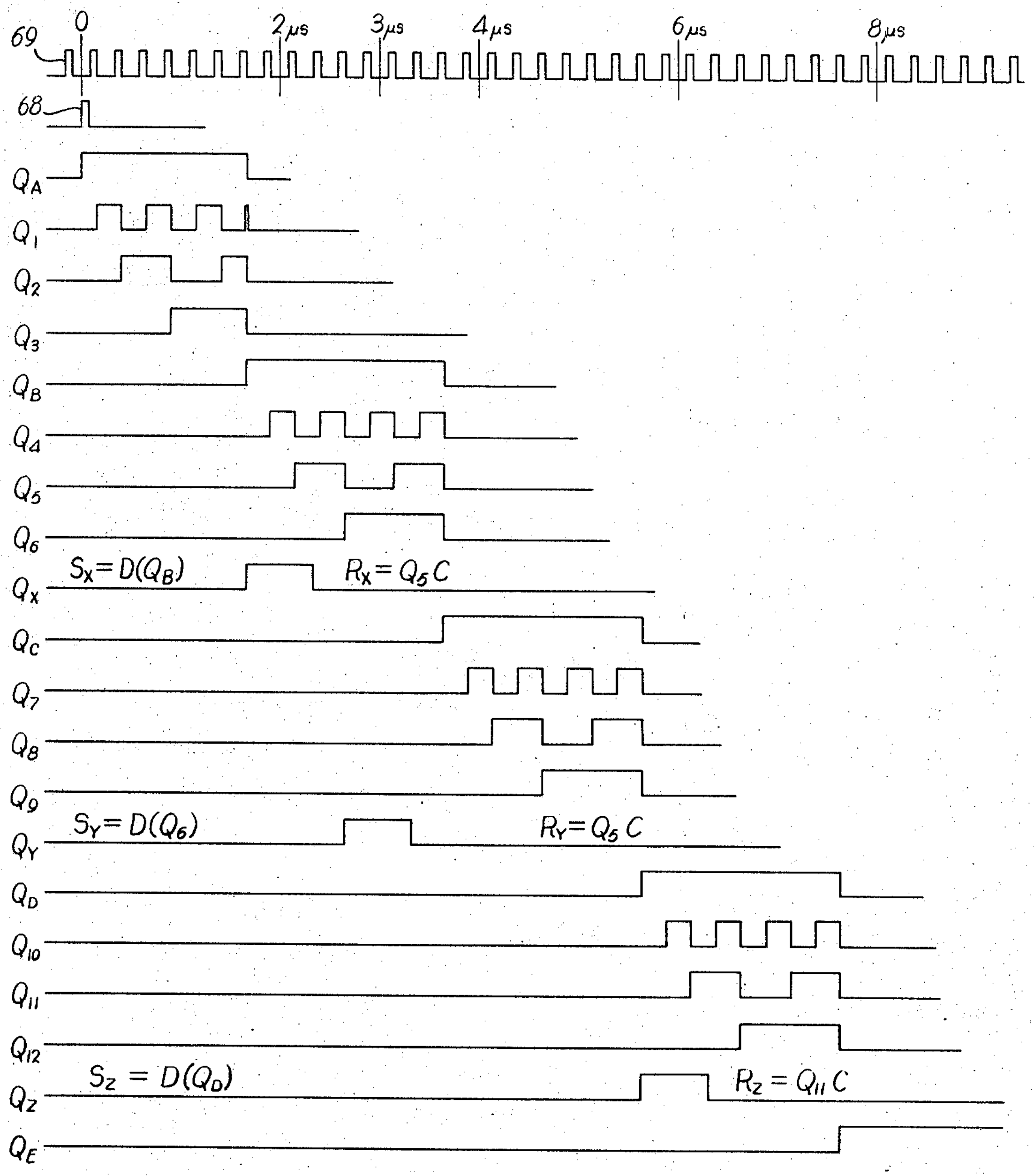
FIG. 3 is a pulse diagram illustrating the operation of the various logic elements shown in FIG. 2.

The operation of the register and decoder of FIG. 2 is illustrated by the pulse diagram of FIG. 3. The various clock pulses 69 covering approximately a 10 microsecond interval are shown on the top line of the timing chart. The first interrogating pulse 68 is illustrated on the second line and has its leading edge at the zero time mark. The Q outputs of the various storage, counter, and window flip-flops are plotted on the remaining lines.

Referring to the graph illustrating the Q output of window flip-flop X, it may be seen that $Q_X$ is at the "1" logic level 2 microseconds after the pulse 68 sets storage flip-flop A. The two microsecond window extends approximately 0.3 microsecond each side of 2 microseconds, resulting in a window from approximately 1.7 to 2.3 microseconds. Thus, a second interrogating pulse 68 arriving from 1.7 to 2.3 microseconds after the first pulse 68 will cause AND gate 94 to deliver an output and, in turn, instruct the encoder 110 that the transponder is being interrogated by a pulse pair having approximately a 2 microsecond spacing. The width of the window is illustrative of a theoretical tolerance or allowable pulse spacing error of $\pm 0.3$ microsecond. In practice, due to displacement of the window caused by the random occurrence of the first interrogating pulse 68 with respect to the clock pulses 69, decoding will always take place in a somewhat narrower time channel, in this case $\pm 0.175$ microsecond. This is computed by substracting the clock pulse spacing of 0.25 $\mu$sec. from the overall window width of 0.6 $\mu$sec.

It may be seen that the counter comprising flip-flops Nos. 1, 2 and 3 will count seven clock pulses 69 and then reset flip-flop A due to the action of AND gate 78. Simultaneously, storage flip-flop B is set. This is done in the instant illustration, rather than providing a divide-by-eight counter, in order to provide a means of defining the leading edge of the 2 microsecond window which, as discussed above, actually occurs at approximately 1.7 microseconds after the first interrogating pulse 68 is received. If the second interrogating pulse 68 is received prior to 1.7 microseconds after the first pulse 68, the register will not respond since storage flip-flop A has not as yet reset and, therefore, is not in a condition to respond to a subsequent input pulse. However, the second interrogating pulse 68 falls within the confines of the window provided by window flip-flop X but is received less than 2 microseconds after the first interrogating pulse 68, decoding by AND gate 94 will be effected but the second pulse will be lost since the second storage flip-flop B will not reset in time to receive the information from flip-flop A when the latter resets. This is due to the 2 microsecond "on" time of flip-flop B as against 1.7 microseconds for flip-flop A. It may be appreciated, however, that all pulse pairs having a 2 microsecond or greater spacing will be transferred from flip-flop A to flip-flop B and on to the remaining storage flip-flops.

The foregoing simply illustrates the versatility of the instant invention and the manner in which the counting times of the various counters can be preselected to accept or reject unwanted pulse combinations without affecting the resolution of the register, such resolution being proportional to the clock frequency. In the instant example, it is not desired to transfer pulse timing information indicating a pulse spacing of less than 2 microseconds on to succeeding stages of the register since there are no decoding gates to utilize such information. The one remaining gate illustrated is provided by AND gate 96 and is representative of multiple pulse decoding. As is clear in FIG. 3, windows are formed by the Y and Z window flip-flops as illustrated by the graphs of $Q_Y$ and $Q_Z$. Thus, three successive interrogating pulses 68 arriving at the set input of flip-flop A at 3 microsecond intervals, plus or minus the tolerance provided by the windows will cause AND gate 96 to deliver an output to the encoder 110.

The logic expressions for the setting and resetting of window flip-flops X, Y and Z appear in FIG. 3 and, of course, correspond to the logic illustrated in FIG. 2. It may be noted that the reset functions for all three of the window flip-flops include a clock pulse C, it being understood that the AND gates 104 and 108 operate on the leading edge of the clock pulses. This enables precise positioning of the trailing edges of the windows at the desired 0.3 microsecond tolerance set forth in the instant example. For other tolerances and different clock frequencies, other AND function combinations would be utilized in accordance with the particular timing logic.

In conclusion, it is apparent that the register of the instant invention may utilize solid state components throughout and, therefore, may comprise integrated circuits which are substantially lighter and smaller physically than passive delay lines. Timing is predetermined by design, may be easily changed by altering the clock frequency or using counters of different counting capacities, and may be rendered drift free through the use of a crystal clock. Furthermore, no attenuation is experienced. As discussed hereinabove, redundant binary stages are eliminated, resulting in a corresponding reduction in the cost of the register.

Having thus described the invention, what is claimed as new and desired to be secured by Letters Patent is:

1. A register for storing coded input pulses having a fixed time spacing between possible successive pulses of at least a predetermined duration, said register comprising:

- a plurality of pulse storage devices, each having a standby state and an information-storing state,
- a first of said devices being adapted to receive said input pulses and undergoing a change from its standby state to its information-storing state in response to receipt of one of said input pulses; and

- digital counter delay means coupled with said first device and a second of said devices for returning said first device to its standby state and changing the state of said second device from its standby state to its information-storing state only at the expiration of a first delay period equal to said predetermined duration and commencing upon said change of state of said first device, whereby the latter is rendered capable for responding only to a subsequent input pulse spaced from said one pulse by at least said predetermined duration, and whereby the timing information previously stored in said first device is shifted to said second device;
- said delay means returning said second device to its standby state at the expiration of a second delay period of preseleced length which commences only upon said change of state of said second device.

2. The invention of claim 1, said delay means including a clock for providing a train of timing signals, and timing means responsive to the occurrence of a number of said signals substantially equivalent to said first delay period for effecting said return of the first device to its standby state and said change of state of the second device from its standby to its information-storing state.

3. A register for storing input pulses having a time spacing between successive pulses of at least a predetermined duration, said register comprising:

- a plurality of pulse storage devices, each having a standby state and an information-storing state,
- a first of said devices being adapted to receive said input pulses and undergoing a change from its standby state to its information-storing state in response to receipt of one of said input pulses;
- delay means coupled with said first device and a second of said devices for returning said first device to its standby state and changing the state of said second device from its standby state to its information-storing state at the expiration of a first delay period equal to said predetermined duration and commencing upon said change of state of said first device, whereby the latter is rendered capable of responding to a subsequent input pulse spaced from said one pulse by at least said predetermined duration, and whereby the timing information previously stored in said first device is shifted to said second device,
- said delay means returning said second device to its standby state at the expiration of a second delay period of preselected length and commencing upon said change of state of said second device,
- said delay means including a clock for providing a train of timing signals, and timing means responsive to the occurrence of a number of said signals substantially equivalent to said first delay period for effecting said return of the first device to its standby state and said change of state of the second device from its standby to its information-storing state,
- said delay means further including another timing means responsive to the occurrence of a series of said signals substantially equivalent to said second delay period of effecting said return of the second device to its standby state.

4. A register for storing input pulses having a time spacing between successive pulses of at least a predetermined duration, said register comprising:

- a plurality of pulse storage devices, each having a standby state and an information-storing state,
- a first of said devices being adapted to receive said input pulses and undergoing a change from its standby state to its information-storing state in response to receipt of one of said input pulses,
- delay means coupled with said first device and a second of said devices for returning said first device to its standby state and changing the state of said second device from its standby state to its information-storing state at the expiration of a first delay period equal to said predetermined duration and commencing upon said change of state of said first device, whereby the latter is rendered capable of responding to a subsequent input pulse spaced from said one pulse by at least said predetermined duration, and whereby the timing information previously stored in said first device is shifted to said second device, said delay means returning said second device to its standby state at the expiration of a second delay period of preselected length and commencing upon said change of state of said second device, said delay means including a first counter responsive to said change of state of said first device from its standby to its information-storing state for providing said first delay period, and a second counter responsive to said change of state of said second device from its standby to its information-storing state for providing said second delay period.

5. The invention of claim 4:

said relay means further including a clock for delivering a train of timing signals to said counters, each of said first and second devices producing an output command upon said change of state from the standby to the informatiton-storing state thereof, said first counter being responsive to the command from said first device for counting a number of said signals substantially equivalent to said first delay period and thereupon effecting said return of the first device to its standby state and said change of state of the second device from its standby to its information-storing state, said second counter being responsive to the command from said second device for counting a series of said signals substantially equivalent to said second delay period and thereupon effecting said return of the second device to its standby state.

6. A register for storing incoming, predeterminedly time-spaced electrical pulses comprising:

a clock for providing a train of timing signals having a spacing equal to $1/n$ of the space between said electrical pulses, $n$ being an integer greater than one, a cascaded series of memory stages including an initial stage and a final stage, each of said stages being provided with a pulse storage device having a standby state, an information-storing state, an input, and means responsive to a change in the electrical condition of said input for causing the device to change from its standby state to its information-storing state, and being further provided with timing means operably associated with said device and responsive to said clock to effect a timing operation by counting said timing signals; and circuit means coupled with the input of the device of said initial stage for delivering said incoming pulses thereto, said device of said initial stage changing from its standby state to its information-storing state when the first of said incoming pulses is received, the timing means of each of said stages being responsive to said timing signals only from and after the time the associated device changes from its standby state to its information-storing state to define a delay period and upon expiration of said delay period the timing means of each of said stages except said final stage effecting delivery of a transfer pulse to the input of the device of the next succeeding stage, whereby the first incoming pulse is effectively shifted from stage-to-stage by the transfer pulses, the timing means of each of said stages including means for returning its associated device to its standby state at the expiration of the delay period of the timing means to permit the device to again respond to a change in the electrical condition of its input, whereby a subsequent incoming pulse is stored in the initial stage if and only if the time spacing between the first incoming pulse and said subsequent pulse is greater than the delay period of the initial stage, and whereby subsequent pulse is then effectively shifted by the transfer pulses if and only if the delay period of a succeeding stage is less than the time spacing between the first incoming pulse and said subsequent pulse.

7. A register for storing incoming, time-spaced electrical pulses comprising:

a clock for providing a train of timing signals, a series of memory stages including an initial stage and a final stage, each of said stages being provided with a pulse storage device having a standby state, an information-storing state, an input, and means responsive to a change in the electrical condition of said input for causing the device to change from its standby state to its information-storing state, and being further provided with timing means operably associated with said device and coupled with said clock;

circuit means coupled with the input of the device of said initial stage for delivering said incoming pulses thereto, whereby said device of the initial stage changes from its standby state to its information-storing state when the first of said incoming pulses is received, the timing means of each of said stages being responsive to said timing signals when the associated device changes from its standby state to its information-storing state, to define a delay period and, upon expiration thereof, the timing means of each of said stages except said first stage effecting delivery of a transfer pulse to the input of the device of the next succeeding stage, whereby the first incoming pulse is effectively shifted from stage-to-stage by the transfer pulses, the timing means of each of said stages returning the associated device to its standby state at the expiration of the delay period of the timing means to permit the device to again respond to a change in the electrical condition of its input, whereby a subsequent incoming pulse is stored in the initial stage if the time spacing between the first incoming pulse and said subsequent pulse is greater than the delay period of the initial stage, and whereby said subsequent pulse is then effectively shifted by the transfer pulses as long as the delay period of a succeeding stage is less than the time spacing of the first incoming pulse and said subsequent pulse, each timing means including a counter operable to count said signals in response to said change of state of the associated device from its standby state to its information-storing state.

8. The invention of claim 7, each of said devices comprising a flip-flop presenting said input and having an output coupled with the associated counter.

9. In combination with the register as set forth in claim 6: decoding means coupled with said circuit means and at least one of said stages for producing an output when said incoming pulses have a preselected time interrelationship.

10. A register for storing incoming, time-spaced electrical pulses comprising:

a clock for providing a train of timing signals, a series of memory stages including an initial stage and a final stage, each of said stages being provided with a pulse storage device having a standby state, an information-storing state, an input, and means responsive to a change in the electrical condition of said input for causing the device to change from its standby state to its information-storing state, and being further provided with timing means operably associated with said device and coupled with said clock;

circuit means coupled with the input of the device of said initial stage for delivering said incoming pulses thereto, whereby said device of the initial stage changes from its standby state to its information-storing state when the first of said incoming pulses is received.

the timing means of each of said stages being responsive to said timing signals when the associated device changes from its standby state to its information-storing state, to define a delay period, and upon expiration thereof, the timing means of each of said stages except said first stage effecting delivery of a transfer pulse to the input of the device of the next succeeding stage, whereby the first incoming pulses is effectively shifted from stage-to-stage by the transfer pulses, the timing means of each of said stages returning the associated device to its standby state at the expiration of the delay period of the timing means to permit the device to again respond to a change in the electrical condition of its input, whereby a subsequent incoming pulse is stored in the initial stage if the time spacing between the first incoming pulse and said subsequent pulse is greater than the delay period of the initial stage, and whereby said subsequent pulse is then effectively shifted by the transfer pulses as long as the delay period of a succeeding stage is less than the time spacing of the first incoming pulse and said subsequent pulse, means coupling with at least one of said stages for providing a decoding window at a preselected time following delivery of said first incoming pulse to the initial stage; and a decoding gate coupled with said circuit means and said window-providing means for producing an output when a later-arriving incoming pulse is delivered to the initial stage said preselected time after said delivery of the first incoming pulse.

11. In combination:

a step register having multiple stages in cascade and operative in response to input pulses, each stage of said step register having a set terminal, a reset terminal, and an output terminal carrying an output signal representative of a state of said stage, a separate counter associated with each of said stages, a clock pulse source connected to drive all said counters in parallel, said counters being normally disabled to count in response to said clock pulse source and having enabling terminals, means connecting said output terminals each to said enabling terminals of the associated counters to enable the associated counters only when said state is a predetermined state, means responsive to attainment by each of the counters of a predetermined count for applying a pulse to the reset terminal of the stage next succeeding that with which that counter is associated and for applying a reset pulse to the stage with which that counter is associated.

12. The combination according to claim 11, wherein is provided means for deriving output signals from each of said counters only on attainment of a predetermined count by that counter.

13. In combination:

a step register having multiple stages connected in cascade, means for transferring states from stage to stage along said register comprising a separate interstage pulse counter associated with each stage.

means for driving said pulse counters in common from a clock, wherein each of said interstage pulse counters includes means for resetting a prior stage and setting a succeeding stage of said register and wherein each of said pulse counters is normally disabled to count and is enabled to count only while its associated register stage is set.

14. The combination according to claim 13, wherein is provided means for deriving output signals only concurrently with selected ones of said clock pulses, whereby the time resolution of said register is determined by the timing of said clock pulses.

15. A transponder for transponding only in response to a predetermined pulse code configuration, said pulse code configuration having a maximum number of possible code pulses having predetermined possible spacings, comprising:

a shift register responsive to said pulse code configuration for storing said pulse code configuration, said shift register having normally disabled stages, clock controlled counter means, the clock of said clock controlled counter means having means for inserting plural clock pulses into said counter means in the intervals between the code pulses of said pulse code configuration, and means for transferring said code pulses along said shift register by enabling said shift register in response to said counter means only while said counter means has a predetermined count greater than unity.

16. In a shift register:

a register stage including a flip-flop normally in a reset stage, said flip-flop including means responsive to an incoming pulse for transferring said flip-flop to a set stage, digital counter means responsive to transfer of said flip-flop to said set stage for initiating a count, means responsive only to attainment of a predetermined count greater than one by said counter means for transferring said flip-flop to the reset stage, whereby said flip-flop is unresponsive to incoming pulses during said predetermined count.

17. A flip-flop:

said flip-flop comprising a set terminal and a reset terminal, means for applying a pulse to said set terminal to transfer state of said flip-flop, a clock controlled digital counter having a predetermined count greater than one, means for inhibiting count by said counter while said flip-flop is reset but enabling said count while said counter is set, and means responsive to attainment of said predetermined count of said counter for resetting said flip-flop.

References Cited

UNITED STATES PATENTS

| | | | |
|---|---|---|---|
| 3,248,558 | 4/1966 | Seif | 328—207 |
| 3,300,724 | 1/1967 | Cutaia | 328—37 |

TERRELL W. FEARS, Primary Examiner

U.S. Cl. X.R.

328—42